(12) United States Patent
Kato et al.

(10) Patent No.: US 11,865,640 B2
(45) Date of Patent: Jan. 9, 2024

(54) CONCENTRIC CYLINDRICAL MEMBER PAIR WELDING METHOD AND WELDING DEVICE THEREOF

(71) Applicant: DENSO CORPORATION, Kariya (JP)

(72) Inventors: Noritsugu Kato, Kariya (JP); Shigeyuki Kusano, Kariya (JP); Yuki Kato, Kariya (JP); Tsuyoshi Hayakawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 687 days.

(21) Appl. No.: 17/087,958

(22) Filed: Nov. 3, 2020

(65) Prior Publication Data
US 2021/0069828 A1    Mar. 11, 2021

Related U.S. Application Data

(63) Continuation of application No. PCT/JP2019/012514, filed on Mar. 25, 2019.

(30) Foreign Application Priority Data

May 11, 2018    (JP) .................................. 2018-092004

(51) Int. Cl.
*B23K 26/28*    (2014.01)
*B23K 26/082*    (2014.01)
(Continued)

(52) U.S. Cl.
CPC .......... *B23K 26/28* (2013.01); *B23K 26/0626* (2013.01); *B23K 26/0676* (2013.01);
(Continued)

(58) Field of Classification Search
CPC ................ B23K 26/28; B23K 26/0626; B23K 26/0676; B23K 26/082; B23K 26/0823;
(Continued)

(56) References Cited

U.S. PATENT DOCUMENTS

| | | |
|---|---|---|
| 2002/0117561 A1 | 8/2002 | Shirai et al. |
| 2005/0205535 A1* | 9/2005 | Shirai .................. B23K 26/282 |
| | | 219/121.76 |

(Continued)

FOREIGN PATENT DOCUMENTS

CN           101342636           1/2009

*Primary Examiner* — John P. Dulka
(74) *Attorney, Agent, or Firm* — Nixon & Vanderhye P.C.

(57) ABSTRACT

An adjustment of the amount of energy in at least one specific applying unit is executed when energy is applied to a cylindrical member pair in which another cylindrical member is inserted inside a cylindrical member to melt and weld the cylindrical member pair in a circumferential direction. The adjustment is executed in association with a rotation angle to satisfy a relationship of Pd+Pw>θ, wherein Pd is an output decease rotation angle that decreases the energy amount from a steady energy amount HP applied from the specific applying unit in a welding end process, Pw is an overlap rotation angle at which the irradiation parts around the cylindrical member pair overlap with the steady energy amount HP, and θ is a separation angle between the specific applying unit and another applying unit adjacent to each other in a rotation direction around the axis.

7 Claims, 9 Drawing Sheets

(51) Int. Cl.
*B23K 26/06* (2014.01)
*B23K 26/067* (2006.01)
*F02M 61/16* (2006.01)

(52) U.S. Cl.
CPC ......... *B23K 26/082* (2015.10); *F02M 61/168* (2013.01); *F02M 2200/8084* (2013.01)

(58) Field of Classification Search
CPC ......... F02M 61/168; F02M 2200/8084; F02M 61/18; F02M 69/045
See application file for complete search history.

(56) References Cited

U.S. PATENT DOCUMENTS

| | | |
|---|---|---|
| 2016/0074964 A1 | 3/2016 | Zollinger et al. |
| 2016/0228989 A1 | 8/2016 | Kamitani et al. |
| 2019/0054563 A1* | 2/2019 | Fierro ................. B23K 26/082 |

* cited by examiner

| SAMPLE No. | Pw | Pd | Pw+Pd | $\theta$ | JUDGEMENT |
|---|---|---|---|---|---|
| S1 | 30 | 30 | 60 | 90 | × |
| S2 | 30 | 120 | 150 | 90 | ○ |
| S3 | 30 | 210 | 240 | 90 | ○ |
| S4 | 30 | 300 | 330 | 90 | ○ |

CONCENTRIC CYLINDRICAL MEMBER PAIR WELDING METHOD AND WELDING DEVICE THEREOF

CROSS REFERENCE TO RELATED APPLICATIONS

This application is a continuation application of International Patent Application No. PCT/JP2019/012514 filed on Mar. 25, 2019, which designated the U.S. and based on and claims the benefits of priority of Japanese Patent Application No. 2018-092004 filed on May 11, 2018. The entire disclosure of all of the above applications is incorporated herein by reference.

TECHNICAL FIELD

The present disclosure relates to welding of a cylindrical member pair in which another cylindrical member is inserted inside a cylindrical member.

BACKGROUND

In a welding device, applying units for applying energy to a welding portion of the cylindrical member pair are arranged at two locations.

SUMMARY

According to one aspect of the present disclosure, a welding method of circumferentially melting and welding a cylindrical member pair in which another cylindrical member is inserted inside a cylindrical member is provided. The welding method has a rotation welding step that relatively rotates an applying unit which applies energy for melting and welding the cylindrical member pair and the cylindrical member pair around an axis of the cylindrical member pair, and applies the energy from the applying unit to the cylindrical member pair to rotate an irradiation part of the energy applied from the applying unit around the axis, and an adjusting step that adjusts the amount of energy applied to the cylindrical member pair from the applying unit in association with a rotation angle of the cylindrical member pair around the axis. In the adjusting step, the adjustment of the amount of energy in a specific applying unit which is at least one of the applying units arranged in two or more locations in a circumferential direction of the cylindrical member pair is executed in association with a rotation angle to satisfy a relationship of $Pd+Pw>\theta$, wherein Pd is an output decease rotation angle that decreases the energy amount from a steady energy amount HP applied from the specific applying unit in a welding end process, Pw is an overlap rotation angle at which the irradiation parts around the cylindrical member pair overlap with the steady energy amount HP, and $\theta$ is a separation angle between the specific applying unit and another applying unit adjacent to each other in a rotation direction around the axis.

DETAILED DESCRIPTION

In an assumable example, a welding device has applying units for applying energy to a welding portion of the cylindrical member pair are arranged at two locations at a predetermined angle in the circumferential direction on a plane orthogonal to an axis of the cylindrical member. The welding device contributes to the prevention of deformation of the welded portion by equalizing the deformation in the entire welding portion around the axis of the cylindrical member.

An injector, which is a welding target product of the example, is a direct injection type injector that is incorporated in an engine block and directly injects fuel into a combustion chamber. This direct injection type injector has a nozzle protruding into the combustion chamber. The nozzle is exposed to strongly acidic acidic condensed water, specifically sulfuric acid, generated in the combustion chamber due to the recirculated air to the combustion chamber in a high temperature environment in the combustion chamber. Therefore, if there is a portion where a residual stress is large due to uneven cooling after welding in the welding portion around the axis of the nozzle, stress corrosion cracking due to acidic condensed water may occur in a high residual stress region. For this reason, it is desirable to reduce the residual stress in the welded portion around the axis, but the welding device leaves room for improvement in this respect. Such a problem is not limited to the injector, but is common to other types of cylindrical member pairs used in a high temperature corrosive environment.

The present disclosure has been made to solve the above problems, and can be implemented as the following embodiments.

According to one aspect of the present disclosure, a welding method of circumferentially melting and welding a cylindrical member pair in which another cylindrical member is inserted inside a cylindrical member is provided. The welding method has a rotation welding step that relatively rotates an applying unit which applies energy for melting and welding the cylindrical member pair and the cylindrical member pair around an axis of the cylindrical member pair, and applies the energy from the applying unit to the cylindrical member pair to rotate an irradiation part of the energy applied from the applying unit around the axis, and an adjusting step that adjusts the amount of energy applied to the cylindrical member pair from the applying unit in association with a rotation angle of the cylindrical member pair around the axis. In the adjusting step, the adjustment of the amount of energy in a specific applying unit which is at least one of the applying units arranged in two or more locations in a circumferential direction of the cylindrical member pair is executed in association with a rotation angle to satisfy a relationship of Pd+Pw>θ, wherein Pd is an output decease rotation angle that decreases the energy amount from a steady energy amount HP applied from the specific applying unit in a welding end process, Pw is an overlap rotation angle at which the irradiation parts around the cylindrical member pair overlap with the steady energy amount HP, and θ is a separation angle between the specific applying unit and another applying unit adjacent to each other in a rotation direction around the axis.

According to the above welding method, by associating welding with energy applied from another applying unit adjacent to each other in a rotation direction around an axis and welding with energy applied from the specific applying unit, it is possible to equalize the temperature distribution in the welding end process at the welding location around the axis of the cylindrical member pair, and to reduce residual stress after cooling.

A. First Embodiment

Figure 1:
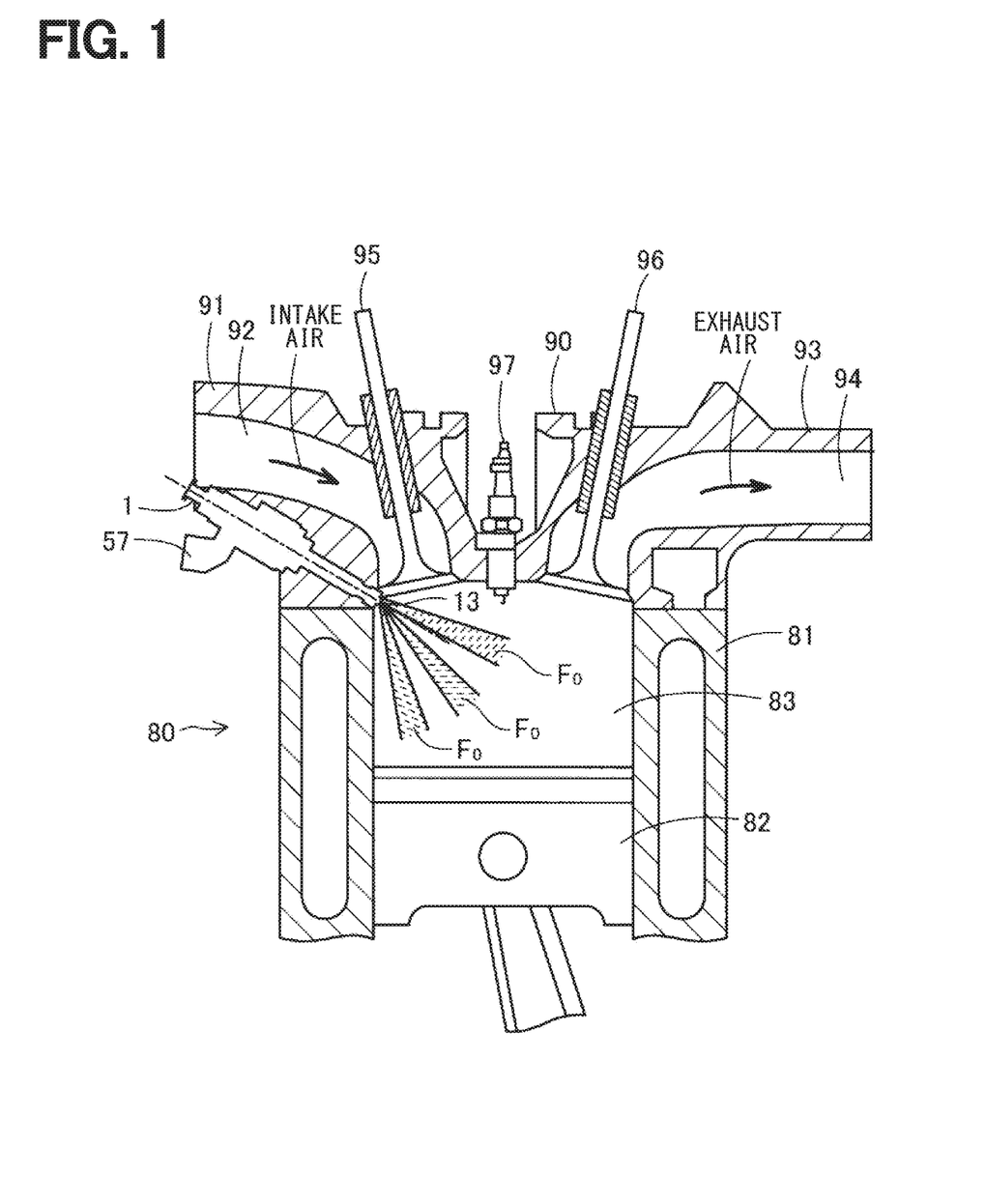
FIG. 1 is an explanatory view showing, in a schematic cross section, a state in which an injector obtained by a welding device of the first embodiment is applied to an engine.

As shown in FIG. 1, an injector 1 including the welding target member of a welding device 200 of the first embodiment is applied to an engine 80 as an internal combustion engine and injects gasoline as a fuel to supply it to the engine 80. The engine 80 includes a cylindrical cylinder block 81, a piston 82, a cylinder head 90, an intake valve 95, an exhaust valve 96, an ignition plug 97, and the like. The piston 82 is provided inside the cylinder block 81 so as to be capable of reciprocating. The cylinder head 90 is provided so as to close an open end of the cylinder block 81. A combustion chamber 83 is formed between an inner wall of the cylinder block 81, a wall surface of the cylinder head 90 and the piston 82. A volume of the combustion chamber 83 increases or decreases as the piston 82 reciprocates. The cylinder head 90 has an intake manifold 91 and an exhaust manifold 93. An intake passage 92 is formed in the intake manifold 91. The intake passage 92 has one end open to an atmosphere and the other end connected to the combustion chamber 83. The intake passage 92 guides an air (hereinafter referred to as "intake air") sucked from the atmosphere side to the combustion chamber 83. An exhaust passage 94 is formed in the exhaust manifold 93. One end of the exhaust passage 94 is connected to the combustion chamber 83, and the other end is open to the atmosphere side. The exhaust passage 94 guides an air (hereinafter referred to as "exhaust air") containing the combustion gas generated in the combustion chamber 83 to the atmosphere side.

The injector 1 is a direct injection type injector that is incorporated in the cylinder block 81 of the intake passage 92 of the intake manifold 91 and directly injects fuel into the combustion chamber 83. The injector 1 is provided so that its center line is inclined with respect to a center line of the combustion chamber 83 or has a twisted relationship with respect to the center line of the combustion chamber 83. Here, the center line of the combustion chamber 83 is the axis of the combustion chamber 83 and coincides with an axis of the cylinder block 81. The injector 1 is provided on a side of the combustion chamber 83. The injector 1 is provided so that the plurality of injection holes 13 are exposed at a radially outer portion of the combustion chamber 83. The injector 1 is supplied with fuel pressurized to a fuel injection pressure by a fuel pump (not shown). From the plurality of injection holes 13 of the injector 1, the conical fuel spray Fo is injected into the combustion chamber 83.

Figure 2:
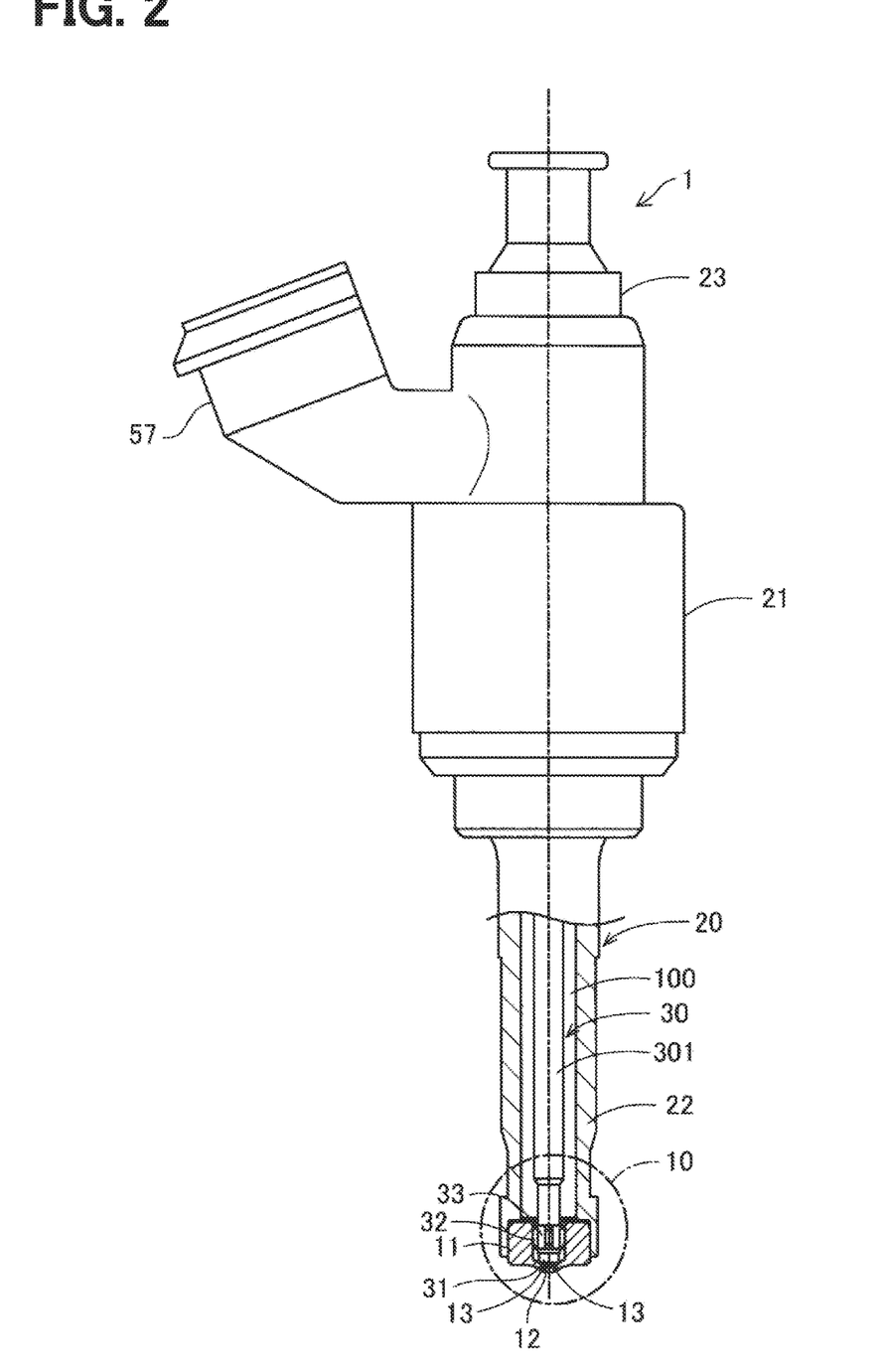
FIG. 2 is a partial cross-sectional front view of an injector obtained by the welding device according to the first embodiment, in which a nozzle which is a main part of the injector is cross-sectioned.

As shown in FIG. 2, the injector 1 includes a nozzle 10 at the tip of a housing 20. The nozzle 10 is made of metal such as martensitic stainless steel. The nozzle 10 is quenched so as to have a predetermined hardness. The nozzle 10 has a tubular portion 11, a bottom portion 12, injection holes 13, a valve seat 14 and the like.

Figure 3:
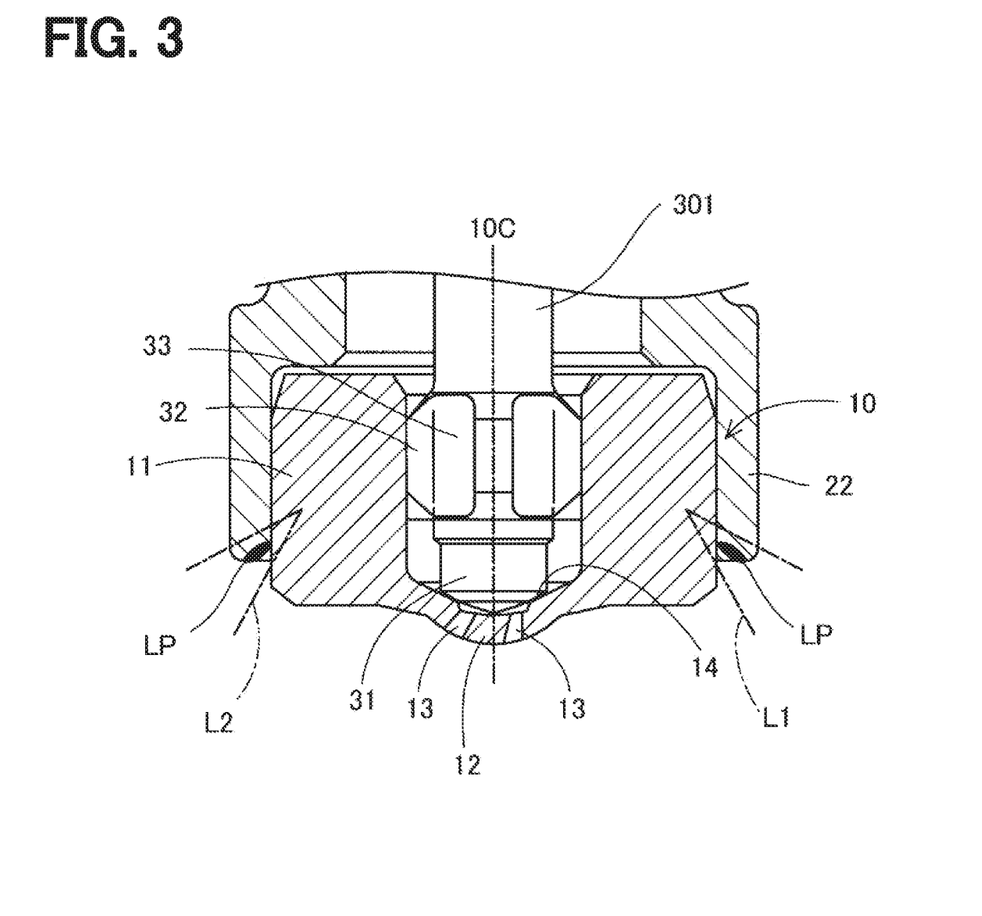
FIG. 3 is an enlarged cross-sectional view showing a nozzle of the injector shown in FIG. 2.

As shown in FIG. 3, the tubular portion 11 is formed in a substantially cylindrical shape. The bottom portion 12 closes one end of the cylindrical portion 11. The injection holes 13 are through holes that penetrate the bottom portion 12, and six injection holes 13 are formed in the bottom portion 12. The valve seat 14 is formed in an annular shape around the injection holes 13 on the tubular portion 11 side of the bottom portion 12.

The housing 20 has a protruding connector portion 57. One end side of a main body portion 21, that is, a lower end side in FIG. 2 constitutes a nozzle holding portion 22, and the other end side (upper end side in FIG. 2) of the main body portion 21 constitutes an inlet portion 23. The main body portion 21 and the nozzle holding portion 22 are formed of a magnetic material such as ferritic stainless steel together with a cylindrical member (not shown) incorporated inside the main body portion 21, and are magnetically stabilized. The inlet portion 23 is formed in a tubular shape from a magnetic material such as ferritic stainless steel. The housing 20 incorporates a cylindrical member, which is made of a nonmagnetic material such as austenitic stainless steel and functions as a magnetic diaphragm, in the main body portion 21.

The nozzle holding portion 22 is provided so that an inner wall on the lower end side in FIG. 2 is fitted to the outer wall of the tubular portion 11 of the nozzle 10. That is, the nozzle 10 which is another cylindrical member, specifically, the tubular portion 11 is inserted inside the nozzle holding portion 22 which is a cylindrical member (see FIG. 3). The nozzle holding portion 22 and the cylindrical portion 11 form a cylindrical member pair in the present disclosure. Then, a welding device 200 of the first embodiment irradiates the laser toward an irradiation part LP in the figure in a state where the tubular portion 11 already inserted inside the nozzle holding portion 22, as shown in FIG. 3. The irradiation part LP may be a side wall on the tip side of the nozzle holding portion 22. Since the irradiation part LP projects into the combustion chamber 83 together with the nozzle 10, it is exposed to the high temperature corrosive environment in the combustion chamber 83. Therefore, it is preferable to reduce the residual stress at the fusion-welded portion by the laser light with which the irradiation part LP is irradiated as much as possible to suppress the occurrence of stress corrosion cracking.

A fuel passage 100 is formed inside the housing 20 from the inlet portion 23 to the tip of the nozzle holding portion 22. The fuel passage 100 is connected to the injection holes 13 of the nozzle 10. That is, the tubular portion 11 of the nozzle 10 forms the fuel passage 100 inside. A pipe (not shown) is connected to the inlet portion 23. As a result, the fuel from the fuel supply source (fuel pump) flows into the fuel passage 100 through the piping, and the inflowing fuel flows into the nozzle 10 after foreign matters are collected through a filter (not shown).

A needle 30 is incorporated in the nozzle holding portion 22. The needle 30 is formed in a rod shape from a metal such as martensitic stainless steel, and is hardened to have a predetermined hardness. The needle 30 is housed in the housing 20 so as to be reciprocally movable in the fuel passage 100 in an axial direction of the housing 20. The needle 30 has a needle body 301, a seat portion 31, a large diameter portion 32, a collar portion 34, and the like. The needle body 301 is formed in a rod shape. The seat portion 31 is formed at the end portion of the needle body 301 on the nozzle 10 side and can contact the valve seat 14.

The large diameter portion 32 is formed near the seat portion 31 at the end of the needle body 301 on the valve seat 14 side. The outer diameter of the large diameter portion 32 is set larger than the outer diameter of the end portion of the needle body 301 on the valve seat 14 side. The large diameter portion 32 is formed so that the outer wall thereof slides on the inner wall of the tubular portion 11 of the nozzle 10. As a result, the needle 30 is guided by the inner wall of the tubular portion 11 and reciprocates in the axial direction of the end portion on the valve seat 14 side. Cutout portions 33 are formed in the large diameter portion 32 such that a plurality of circumferential portions of the outer wall are notched. Thereby, the fuel can flow between the cutout portions 33 and the inner wall of the tubular portion 11.

The needle 30 reciprocates along the axial direction of the housing 20 by a needle drive mechanism (not shown) incorporated in the main body portion 21, and the needle 30 opens and closes the injection holes 13 by the seat portion 31 separating (not seating) from the valve seat 14 or contacting (seating) the valve seat 14. By opening and closing the injection holes 13, the injector 1 injects fuel from the injection holes 13 to the engine 80. The needle drive mechanism is configured using a coil spring, a coil that generates a magnetic force through energization, and the like, but since these configurations are not directly related to the present disclosure, their illustration and description are omitted.

Figure 4:
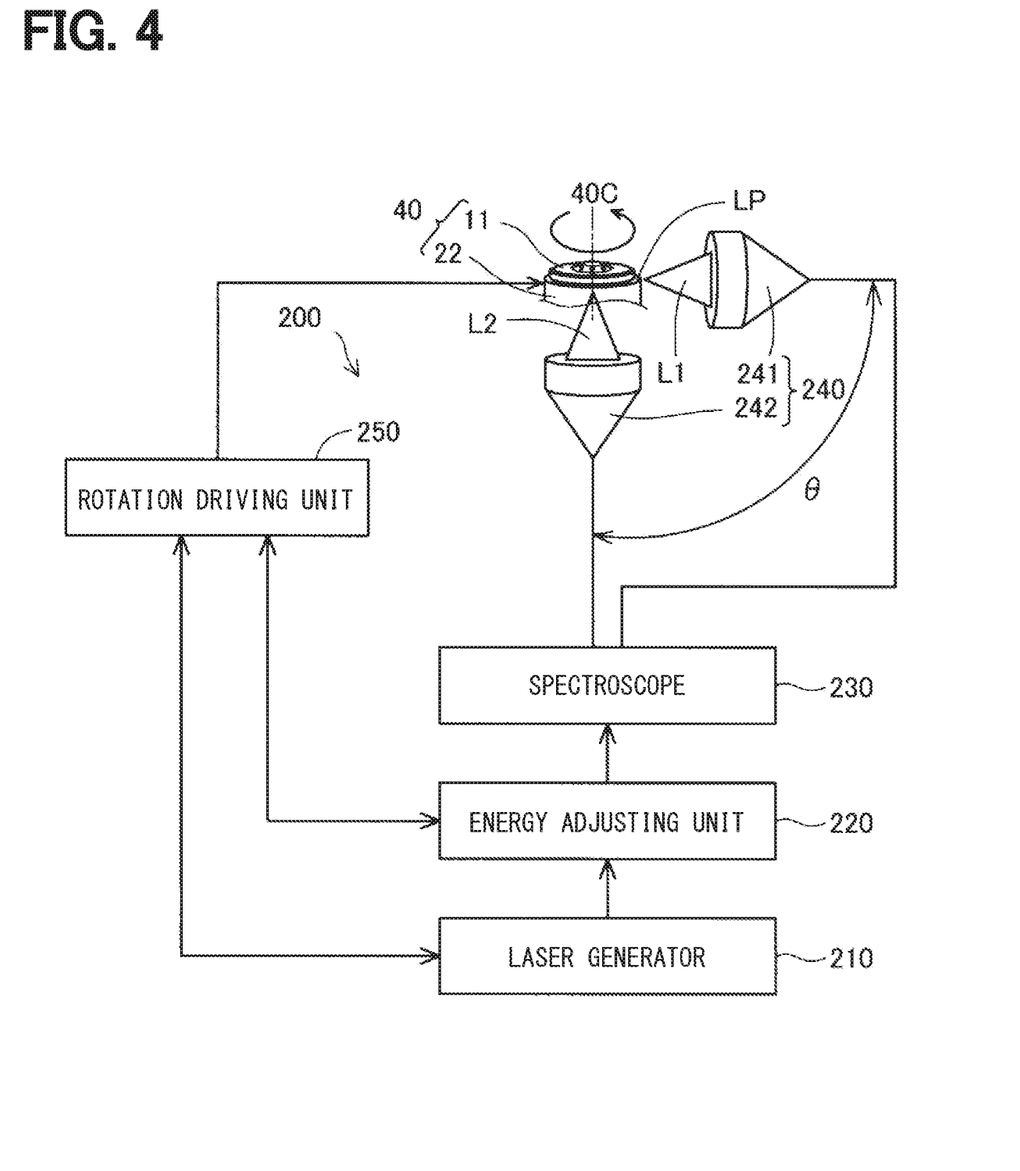
FIG. 4 is an explanatory view schematically showing an outline of the welding device according to the first embodiment.

As shown in FIG. 4, the welding device 200 of the first embodiment welds the nozzle holding portion 22 and the tubular portion 11 of the injector 1 described above. The welding device 200 includes a laser generator 210 as an energy source, an energy adjusting unit 220, a spectroscope 230, a first optical head 241, a second optical head 242, and a rotation driving unit 250. The welding mode member of the welding device 200 is the nozzle holding portion 22 into which the tubular portion 11 is inserted, and the housing 20 is set in the welding device 200. Hereinafter, the nozzle holding portion 22 into which the tubular portion 11 is inserted is referred to as a cylindrical member pair 40.

The laser generator 210 is a device that generates a high energy laser for melting and welding the cylindrical member pair 40 in the circumferential direction, and for example, a YAG laser or a $CO_2$ laser can be used. The energy adjusting unit 220 adjusts the energy amount of the laser light when guiding the laser light generated by the laser generator 210 to the spectroscope 230. The spectroscope 230 splits the laser light whose energy amount has been adjusted by the energy adjusting unit 220 into two directions, and guides the split laser light to the first optical head 241 and the second optical head 242. The laser generator 210 may have an adjusting function of adjusting the energy amount of laser light.

The first optical head 241 and the second optical head 242 irradiate the irradiation part LP of the cylindrical member pair 40 with the laser light guided from the spectroscope 230. The first optical head 241 and the second optical head 242 correspond to the applying unit in the present disclosure, and are located at two locations in the circumferential direction on a plane orthogonal to an axis 40C of the cylindrical member pair 40 that is the welding target. The first optical head 241 and the second optical head 242 are adjacent to each other around the axis of the cylindrical member pair 40, and a separation angle θ around the axis 40C of the cylindrical member pair 40 is 80°≤θ≤110. In the present embodiment, the separation angle θ is 90°. That is, the first optical head 241 and the second optical head 242 are rotationally asymmetrically arranged at two locations around the axis 40C of the cylindrical member pair 40. Then, the first optical head 241 and the second optical head 242 irradiate the irradiation part LP shown in FIG. 3 with laser light at a laser irradiation angle inclined with respect to the axis 40C. The first optical head 241 and the second optical head 242 may irradiate the laser light along a plane orthogonal to the axis 40C. In the following description, the first optical head 241 and the second optical head 242 are collectively referred to as the optical head 240. Further, the laser light emitted from the first optical head 241 is referred to as a first laser light L1, and the laser light emitted from the second optical head 242 is referred to as a second laser light L2 to distinguish them.

The rotation driving unit 250 corresponds to the rotating unit in the present disclosure, and rotates the cylindrical member pair 40 around the axis at a constant speed and rotates an irradiation part of energy applied from the optical head 240 to the cylindrical member pair 40, that is, an irradiation part of laser light around the axis 40C. In the present embodiment, the rotation driving unit 250 rotates the cylindrical member pair 40 counterclockwise at a constant speed at a rotation speed (for example, 30 rpm) at which the cylindrical member pair 40 makes one rotation about the axis in 2 to 5 seconds. Therefore, both optical heads rotate at a constant speed in the clockwise direction relative to the cylindrical member pair 40. Laser irradiation is performed from the optical head 240 to the irradiation part LP of the cylindrical member pair 40 that rotates at a constant speed. Therefore, the energy adjusting unit 220 functions as an adjusting unit that adjusts the amount of energy applied from the optical head 240 to the cylindrical member pair 40 in association with the rotation angle of the cylindrical member pair 40 around the axis. The laser generator 210, the energy adjusting unit 220, and the control unit that integrally controls the rotation driving unit 250 may be configured by a so-called computer having a CPU, a ROM, a RAM, and the like that execute logical operations.

The welding device 200 having the above-described configuration irradiates the cylindrical member pair 40, which rotates at a constant speed around the axis with the first laser lights L1 and L2 from the first optical head 241 and the second optical head 242, and melt-welds the cylindrical member pair 40 over the entire circumference at the irradiation part LP. Instead of the laser light, other energy such as arc discharge or electron beam may be used.

Figure 5:
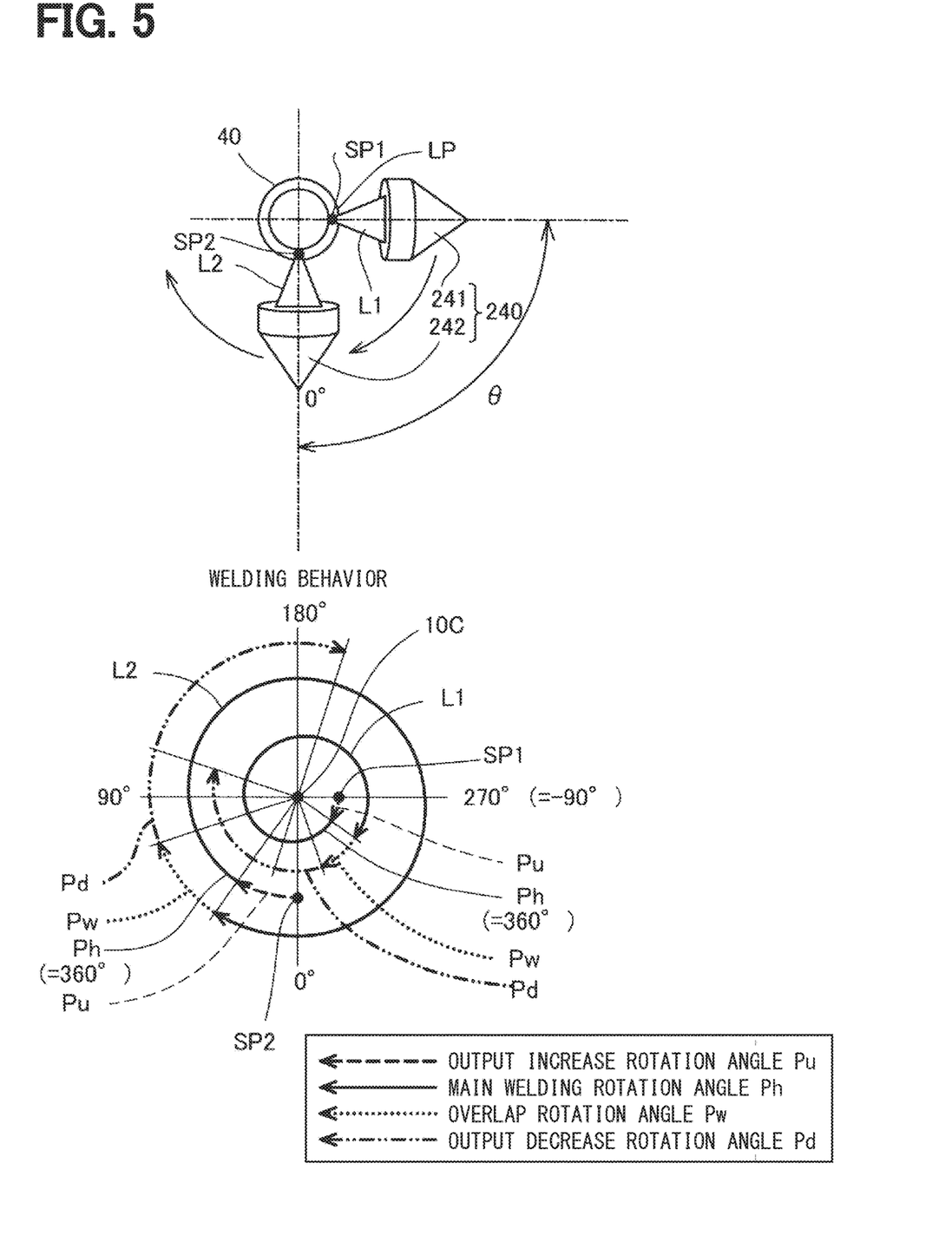
FIG. 5 is an explanatory view showing a welding situation by the welding device of the first embodiment.

Next, melt-welding by the welding device 200 of the present embodiment will be described with reference to FIGS. 5 and 6. An upper part of FIG. 5 shows that the first optical head 241 and the second optical head 242 are separated by an angle θ. A lower part shows that the welding behavior when the laser light is emitted while the optical head 240 relative to the cylindrical member pair 40 in a clockwise direction is associated with the rotational positions of both heads. In the lower part of FIG. 5, the welding behavior of the first optical head 241 is associated with the rotational position of the first optical head 241 itself on the inner side. On the outside thereof, the welding behavior of the second optical head 242 is associated with the rotational position of the second optical head 242 itself. For convenience of description, an irradiation start position SP2 of the second laser light L2 from the second optical head 242 is set to a reference angle of 0° around the axis 40C of the cylindrical member pair 40 that receives laser irradiation, and an angle around the axis 40C is defined as an angle measured clockwise from this reference angle.

Figure 6:
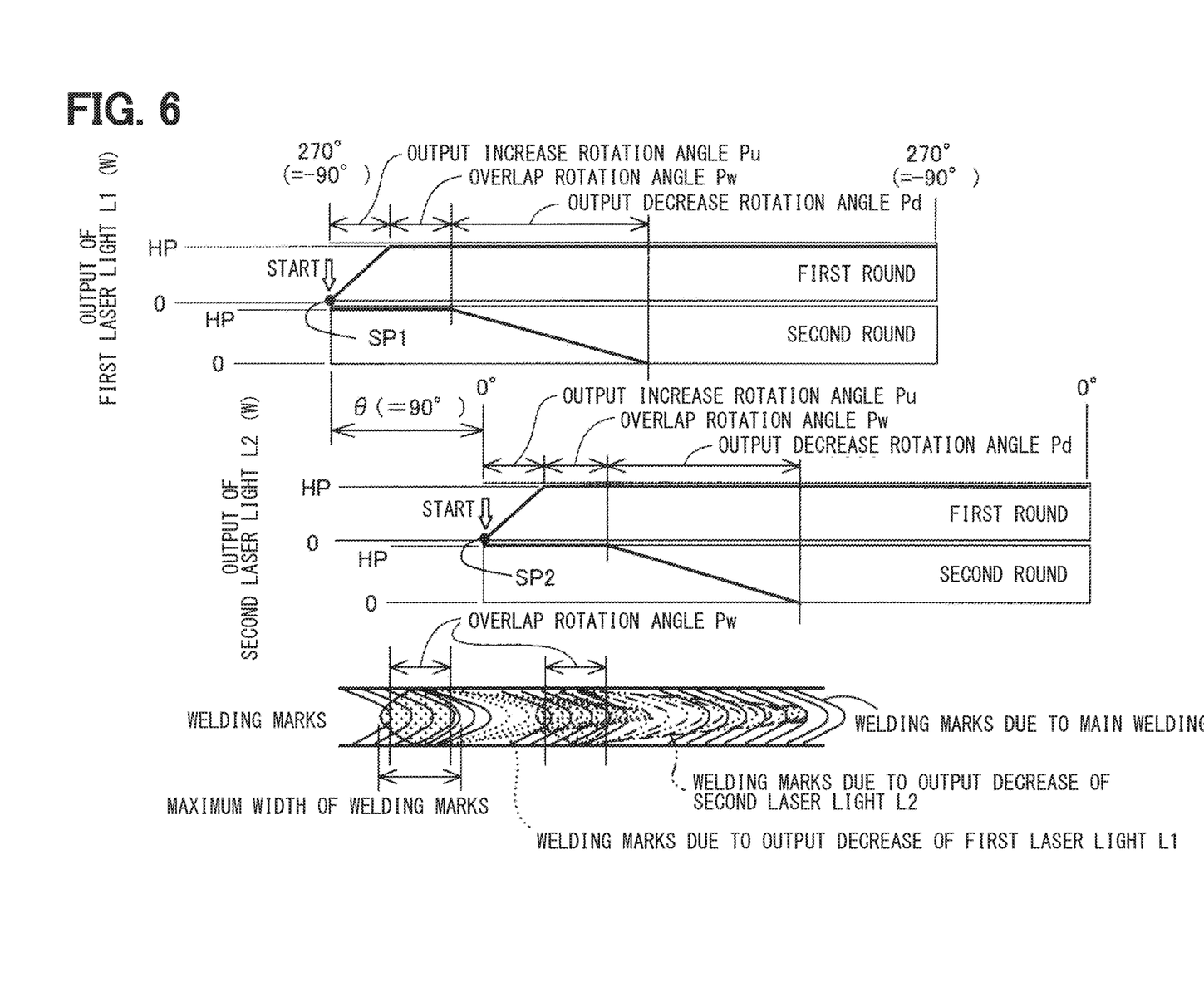
FIG. 6 is an explanatory view showing a relationship between a state of a laser output emitted from each of the applying units of the welding device of the first embodiment and a welding mark.

In the upper part of FIG. 6, a transition of the amount of energy of the first laser light L1 emitted from the first optical head 241 is shown in association with the rotation angle of the cylindrical member pair 40. In a middle part of FIG. 6, a transition of the amount of energy of the second laser light L2 emitted from the second optical head 242 is shown in association with the rotation angle of the cylindrical member pair 40. Then, in the lower part, an example of welding marks left on the cylindrical member pair 40 by welding accompanying laser irradiation from the first optical head 241 and the second optical head 242 is shown.

The first optical head 241 and the second optical head 242 simultaneously start laser irradiation when positioned at irradiation start positions SP1 and SP2 shown in FIG. 5. Before the laser irradiation, the cylindrical member pair 40 has already been rotated at a constant speed. When the laser irradiation is started from both optical heads at the irradiation start positions SP1 and SP2, the energy adjusting unit 220 of FIG. 4 gradually increases the amount of energy of the laser light guided to both optical heads from a value of zero to a specified steady energy amount HP. The above-mentioned state is shown in FIG. 6, and the amount of energy of the second laser light L2 emitted from the second optical head 242 increases from the irradiation start position SP2 at an angle of 0° (see FIG. 5). The amount of energy of the first laser light L1 emitted from the first optical head 241 increases from the irradiation start position SP1 at an angle of 270° (=−90°). The increase in output at the start of welding is performed in the rotation process in which the cylindrical member pair 40 rotates to an output increase rotation angle Pu. When the cylindrical member pair 40 rotates to the output increase rotation angle Pu, the energy amount of the laser light emitted from both optical heads becomes the steady energy amount HP. This steady energy amount HP is an energy amount that can melt and weld the cylindrical member pair 40 (the nozzle holding portion 22 into which the tubular portion 11 is inserted) at the irradiation part LP (see FIG. 3), and is defined in advance based on the specifications such as the material and thickness of the tubular portion 11 and the nozzle holding portion 22 that form the cylindrical member pair 40.

After the cylindrical member pair 40 has rotated to the output increase rotation angle Pu, the energy adjusting unit 220 maintains the energy amount of the laser light guided to both optical heads at the steady energy amount HP. This energy amount maintenance is continued in the rotating process in which the cylindrical member pair 40 rotates over the main welding rotation angle Ph (=360°). That is, until the cylindrical member pair 40 rotates once about the axis 40C, the first laser light L1 is continuously emitted from the first optical head 241 with the steady energy amount HP, and the second laser light is also continuously emitted from the second optical head 242. By continuing the laser light irradiation in this way, in the cylindrical member pair 40, the tubular portion 11 and the nozzle holding portion 22 are melt-welded (main welded) over the entire circumference at the irradiation part LP.

When the cylindrical member pair 40 rotates over the main welding rotation angle Ph, in order to ensure melt-welding over the entire circumference, the energy adjusting unit 220 sets the energy amount of the laser light guided to both optical heads to the steady energy amount HP. Thereby, the maintenance of the energy amount is further continued in the rotating process in which the cylindrical member pair 40 rotates over an overlap rotation angle Pw which overlaps the main welding rotation angle Ph. That is, over the overlap rotation angle Pw, the energy irradiation part that receive the laser light irradiation with the steady energy amount HP is overlapped, and the cylindrical member pair 40 is overlap-welded.

When the cylindrical member pair 40 rotates over the overlap rotation angle Pw, the welding of the cylindrical member pair 40 thereafter shifts to a welding end process. Therefore, the energy adjusting unit 220 gradually reduces the energy amount of the laser light guided to both optical heads from the steady energy amount HP in the welding end process. This output reduction is performed in a rotation process in which the cylindrical member pair 40 is rotated to an output decrease rotation angle Pd after receiving the overlap welding, and when the cylindrical member pair 40 is rotated to the output decrease rotation angle Pd, the amount of energy of the laser light emitted from both optical heads becomes zero, and the welding of the cylindrical member pair 40 is completed. After the welding is completed, the rotation driving unit 250 continues the rotation of the cylindrical member pair 40 until the cooling of the welded portion is completed, and stops the rotation of the cylindrical member pair 40 with the completion of the cooling. The nozzle 10 in which the cylindrical member pair 40 has been welded, specifically, the housing 20 having the nozzle 10 is removed from the rotation driving unit 250. Then, the new housing 20 is set in the rotation driving unit 250 so as to be rotated by the rotation driving unit 250.

The energy adjusting unit 220 in the welding device 200 of the present embodiment cooperates with the constant speed rotation control of the cylindrical member pair 40 by the rotation driving unit 250, and adjusts the energy amount of the laser light emitted from both optical heads in association with the following rotation angles so that a relationship of the following relational expression is satisfied. The relational expression is Pd+Pw>θ, wherein Pd is the output decrease rotation angle, Pw is the overlap rotation angle, and the angle θ is the separation angle between the first optical head 241 and the second optical head 242. In this case, the output decrease rotation angle Pd and the overlap rotation angle Pw are set to values which are not zero. Further, in the above rotation angle for adjusting the amount of energy, it is preferable that the output decrease rotation angle Pd is set to satisfy the relationship Pd>Pw with respect to the overlap rotation angle Pw. In addition to this relationship, it is preferable that the output decrease rotation angle Pd be set to satisfy the relationship Pd≥θ with respect to the separation angle θ of both optical heads. In the first embodiment, when adjusting the amount of energy associated with the rotation angle, the output increase rotation angle Pu, the output decease rotation angle Pd, and the overlap rotation angle Pw at the start of welding have the same value in the first optical head 241 and the second optical head 242.

As shown in FIG. 6, the welding marks left on the cylindrical member pair 40 due to the series of welding behaviors described above becomes a narrow transition welding marks that gradually narrow from the welding marks in the main welding during the output decrease rotation angle Pd. Then, on the narrow transition welding marks due to the second optical head 242 where welding precedes at the rotation angle around the axis of the axis 40C, the narrow transition welding marks due to the first optical head 241 where welding follows at the rotation angle around the axis of the axis 40C overlap. The overlap of the welding marks is caused by setting the output decrease rotation angle Pd and the separation angle θ between both optical heads so that Pd>θ. The maximum width of the nugget is about 1.1 times the overlap rotation angle Pw.

Figure 7:
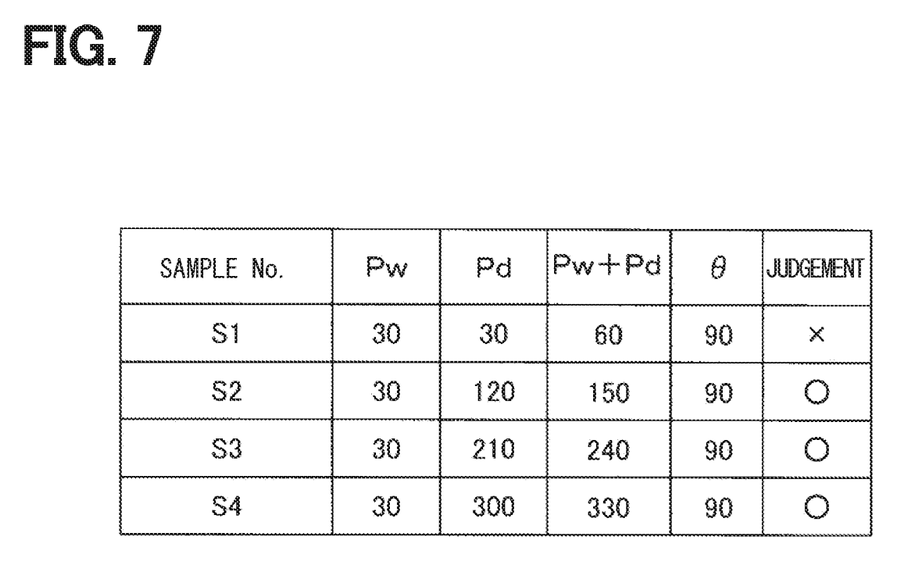
FIG. 7 is an explanatory view showing specifications of an output decrease rotation angle Pd, an overlap rotation angle Pw, and a separation angle $\theta$ for each welding sample.

Next, the residual stress remaining in the welded cylindrical member pair 40 will be described. Stress remains at the welded portion of the cylindrical member pair 40 around the axis of the axis 40C due to the melt-welding that occurs by receiving the energy of the first laser light L1 and the energy of the second laser light L2 and the subsequent cooling. The residual stress was measured for each rotation angle in the entire welding portion of the cylindrical member pair 40 according to a residual stress measurement method using X-rays. As shown in FIG. 7, the measurement samples are four measurement samples in which the separation angle θ (=90°) between the first optical head 241 and the second optical head 242 and the overlap rotation angle Pw (=30°) are common. As described above, in first sample S1, the sum (Pw+Pd) of the overlap rotation angle Pw and the output decrease rotation angle Pd for adjusting the energy amount is smaller than the separation angle θ between both optical heads (Pd+Pw<θ). In each of second sample S2, third sample S3, and fourth sample S4, the sum (Pw+Pd) of the overlap rotation angle Pw and the output decrease rotation angle Pd is larger than the separation angle θ between of both optical heads (Pd+Pw>θ).

Figure 8:
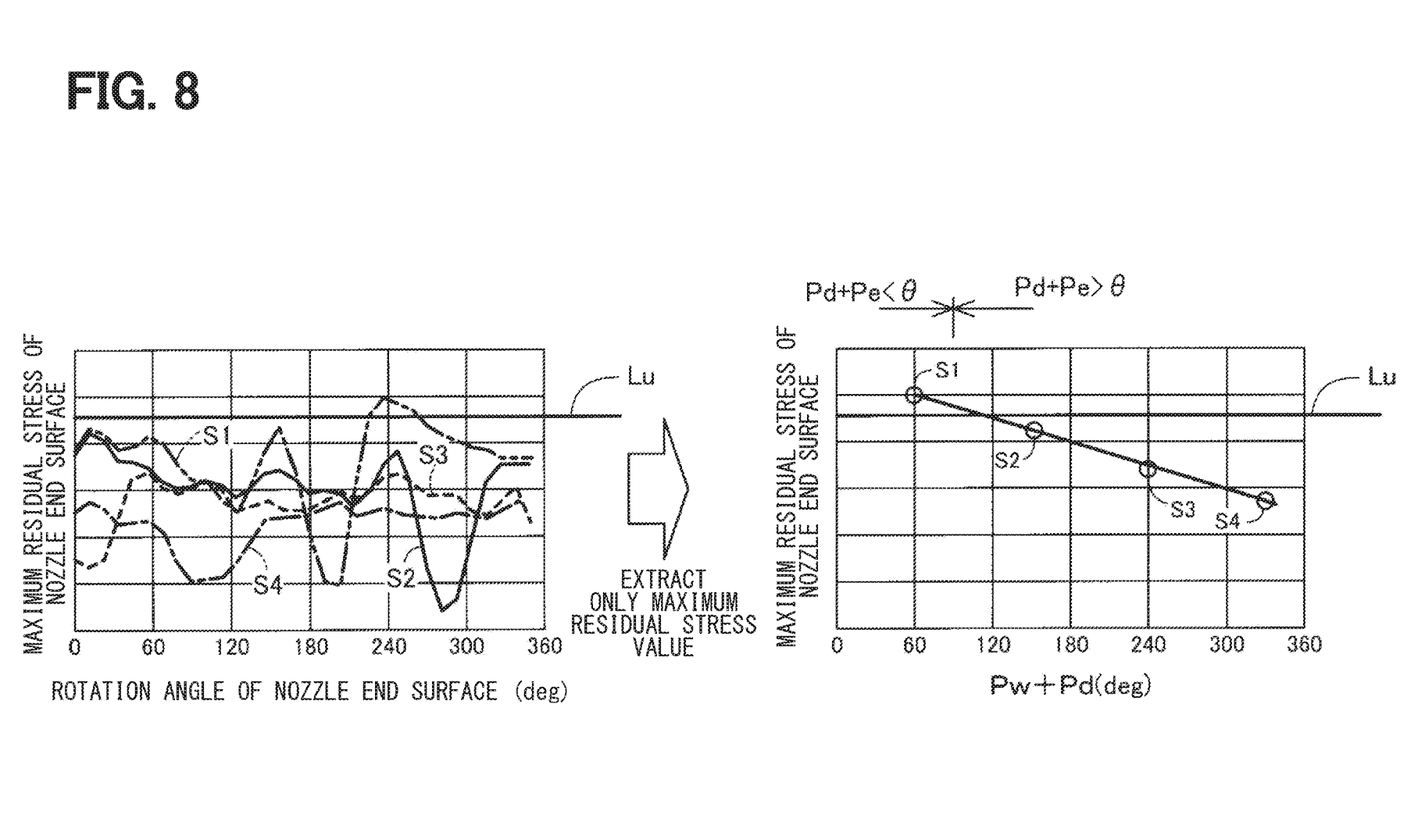
FIG. 8 is an explanatory view showing a residual stress distribution for each welding portion for each welding sample.

As shown in FIG. 8, the residual stress in the cylindrical member pair 40 of these samples differs depending on the rotation angle of the nozzle end surface, which is the welding location to the cylindrical member pair 40, and only in the first sample S1 (shown by the chain double-dashed line), the maximum residual stress exceeds a judgment value Lu. Based on the above result, according to the welding device 200 of the present embodiment, the relationship between the separation angle θ between the first optical head 241 and the second optical head 242 adjacent to each other, the overlap rotation angle Pw, and the output decrease rotation angle Pd is set to satisfy the relationship of Pd+Pw>θ. Therefore, it is possible to equalize the temperature distribution in the welding end process at the welding location around the axis 40C of the cylindrical member pair 40, and thereby reduce the residual stress after cooling. In the samples of FIGS. 7 and 8, all separation angles θ are set to 90°, but similar results can be obtained when the separation angles θ are set to values other than 90°.

In the welding device 200 of the present embodiment, the output decrease rotation angle Pd is set to satisfy the relationship of Pd>Pw with respect to the overlap rotation angle Pw. That is, since the output decrease rotation angle Pd is set to a value larger than the overlap rotation angle Pw, the angle range in which the energy is gradually reduced at the end of welding is sufficiently wide, and the residual stress can be further reduced.

In the welding device 200 of the present embodiment, the output decrease rotation angle Pd is set to satisfy the relationship of Pd≤θ with respect to the separation angle θ between the first optical head 241 and the second optical head 242. Also from the above point, the range of the angle at which the energy is gradually reduced at the end of welding can be sufficiently increased, and the residual stress can be further reduced.

In the first optical head 241 and the second optical head 242 in the welding device 200 of the present embodiment, the output increase rotation angle Pu, the output decrease rotation angle Pd, and the overlap rotation angle Pw, which adjust the amount of energy associated with the rotation angle around the axis 40C of the cylindrical member pair 40, are the same. Therefore, as shown in FIG. 4, the laser beam whose energy amount has been adjusted by the energy adjusting unit 220 may be dispersed by the spectroscope 230 and guided to the first optical head 241 and the second optical head 242. As a result, the cost can be reduced by simplifying the device configuration.

In the welding device 200 of the present embodiment, the first optical head 241 and the second optical head 242 are arranged at two locations around the axis 40C of the cylindrical member pair 40, and the separation angle θ both optical heads along the rotation direction of the cylindrical member pair 40 is set to satisfy 80°≤θ≤110°, and is 90° in the present embodiment. Lasers are irradiated from the first optical head 241 and the second optical head 242 to the positions of the cylindrical member pair 40 that are separated by approximately 90°. Therefore, the second laser light L2 from the second optical head 242 is irradiated from a direction in which the nozzle holding portion 22 and the tubular portion 11 of the cylindrical member pair 40 are about to be deformed by the first laser light L1 emitted from the first optical head 241. Therefore, the nozzle holding portion 22 and the tubular portion 11 are deformed in directions orthogonal to each other, and are deformed uniformly as a whole.

B. Second Embodiment

Figure 9:
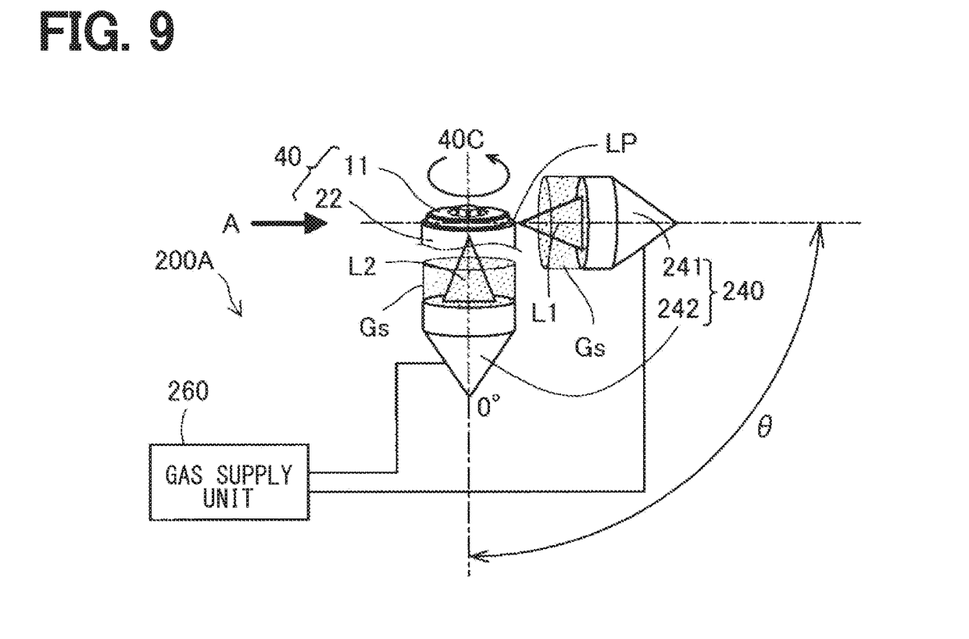
FIG. 9 is an explanatory view schematically showing the outline of the welding device according to a second embodiment.
Figure 10:
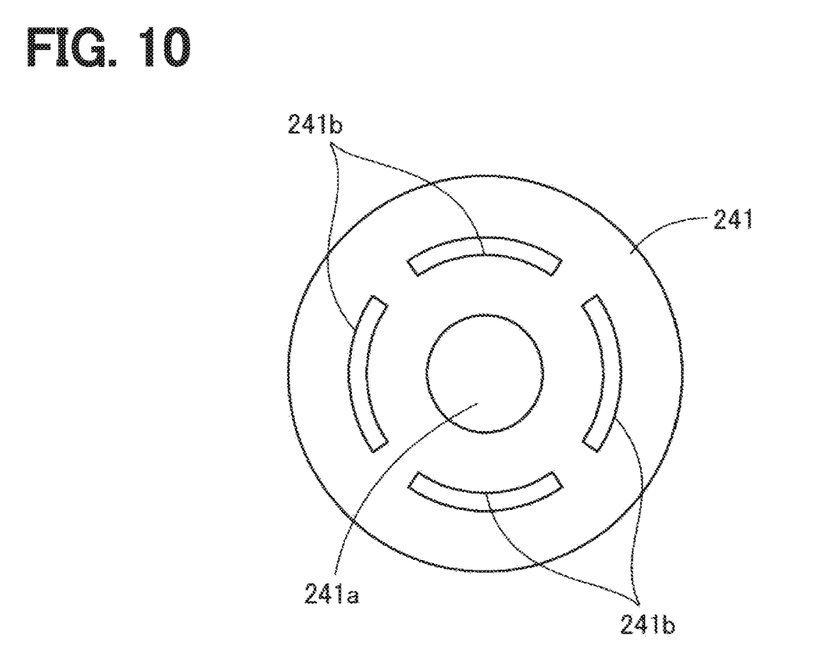
FIG. 10 is an explanatory diagram showing the first optical head in the welding device of the second embodiment as viewed from a direction A in FIG. 9.

As shown in FIG. 9, the welding device 200A of the second embodiment includes a gas supply unit 260 that supplies an inert gas such as argon to the first optical head 241 and the second optical head 242. The welding device 200A also has the laser generator 210 and the energy adjusting unit 220 shown in FIG. 4, but the illustration thereof is omitted in FIG. 9. As shown in FIG. 10, the first optical head 241 has a plurality of arc-shaped long-diameter gas emission holes 241b around the laser emission hole 241a and surrounds the first laser light L1 emitted from the laser emission hole 241a with the radiation inert gas from the plurality of gas emission hole 241b. The same applies to the second optical head 242. By doing so, the welding device 200A rapidly lowers the temperature of the welded portion by the emitted laser light, and thus the reduction of the residual stress obtained by defining the overlap rotation angle Pw and the like as described above is further improved.

C. Other Embodiments (1) In the above embodiment, the cylindrical member pair 40 is rotated about the axis 40C, but the first optical head 241 and the second optical head 242 may be rotated about the axis 40C of the cylindrical member pair 40.

(2) In the above-described embodiment, in the laser light emission from both the first optical head 241 and the second optical head 242, the amount of energy is adjusted according to the rotation angle of the cylindrical member pair 40. However, it is not limited to this configuration. That is, at least one optical head of the both optical heads, for example, the second optical head 242 to which welding is preceded at the rotation angle around the axis of the axis 40C is used as the specific applying unit in the present disclosure, and in the laser light emission from the second optical head 242 the amount of energy thereof may be adjusted in response to the rotation angle of the cylindrical member pair 40. In this case, the laser light emission from the first optical head 241 may be performed by the existing adjusting method for energy amount. Alternatively, the first optical head 241 to which welding is subsequently performed at the rotation angle around the axis of the axis 40C is used as the specific applying unit in the present disclosure, and the adjustment of energy amount described above is performed. The laser light emission from the other second optical heads 242 may be performed by the existing adjusting method for energy amount. By doing so, the first optical head 241 lastly applies the energy of the steady energy amount HP to the same position of the cylindrical member pair 40 which is rotating around the axis. Therefore, it is possible to reduce the residual stress after leaving the narrow transition welding marks due to the first laser light L1 shown in FIG. 6.

(3) In the above embodiment, the first optical head 241 and the second optical head 242 are arranged at rotationally asymmetrical positions around the axis 40C of the cylindrical member pair 40. However, a plurality of optical heads may be arranged at rotationally symmetrical positions about the axis 40C. In this case, it is preferable that the relationship of $Pd+Pw>\theta$ is satisfied for energy irradiation from a plurality of optical heads.

(4) In the above embodiment, the output increase rotation angle Pu, the output decrease rotation angle Pd, and the overlap rotation angle Pw are the same in the first optical head 241 and the second optical head 242, but the present disclosure is not limited to this configuration. For example, the energy adjusting unit 220 may be provided for each optical head to adjust the amount of energy corresponding to different rotation angles for each optical head. Specifically, the overlap rotation angle Pw and the output decrease rotation angle Pd may be different for each optical head on the assumption that the relationship of $Pd+Pw>\theta$ is satisfied.

(5) In the above embodiment, two optical heads, the first optical head 241 and the second optical head 242, are used. However, three or more optical heads are arranged at substantially equal intervals with an angle $\theta$ such that the tubular portion 11 and the nozzle holding portion 22 of the cylindrical member pair 40 may be welded. When arranging three or more optical heads, if the number of optical heads is n and the separation angle between adjacent optical heads in the circumferential direction is $\theta°$, the optical heads are arranged so as to satisfy the relationship of $(360/n)-10 \leq \theta \leq (360/n)+10$. Due to the structure of the welding device, the number of optical heads provided is limited to about 10.

(6) In the above embodiment, the welding target is the nozzle 10 which is the cylindrical member pair 40 in the injector 1. However, the welding target is not limited to the nozzle 10 as long as the cylindrical member pair in which another cylindrical member is inserted inside the cylindrical member is melted and welded in the circumferential direction.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A welding method for circumferentially melting and welding a cylindrical member pair in which another cylindrical member is inserted inside a cylindrical member, comprising:

a rotation welding step that relatively rotates an applying unit which applies energy for melting and welding the cylindrical member pair and the cylindrical member pair around an axis of the cylindrical member pair, and applies the energy from the applying unit to the cylindrical member pair to rotate an irradiation part of the energy applied from the applying unit around the axis; and an adjusting step that adjusts the amount of energy applied to the cylindrical member pair from the applying unit in association with a rotation angle of the cylindrical member pair around the axis, wherein in the adjusting step, the adjustment of the amount of energy in a specific applying unit which is at least one of the applying units arranged in two or more locations in a circumferential direction of the cylindrical member pair is executed in association with a rotation angle to satisfy a relationship of $Pd+Pw>\theta$, wherein Pd is an output decease rotation angle that decreases the energy amount from a steady energy amount HP applied from the specific applying unit in a welding end process, Pw is an overlap rotation angle at which the irradiation parts around the cylindrical member pair overlap with the steady energy amount HP, and $\theta$ is a separation angle between the specific applying unit and another applying unit adjacent to each other in a rotation direction around the axis.

2. The welding method according to claim 1, wherein the output decrease rotation angle Pd and the overlap rotation angle Pw are both set to be larger than zero and to satisfy a relationship of $Pd>Pw$.

3. The welding method according to claim 1, wherein the output decrease rotation angle Pd is set to satisfy a relationship of $Pd \geq \theta$ with respect to the separation angle $\theta$.

4. The welding method according to claim 1, wherein the applying units are arranged in two or more locations in a rotationally asymmetric manner around the axis, and the specific applying unit is an applying unit that finally applies energy to the same portion of the cylindrical member pair.

5. The welding method according to claim 1, wherein in the rotation welding step, the applying units are arranged at two locations around the axis, and the separation angle $\theta$ along the rotation direction is set to $80° \leq \theta \leq 110°$.

6. The welding method according to claim 1, wherein in the adjusting step, when adjusting the energy amount in association with the rotation angle, an output increase rotation angle Pu that increases the energy amount to the steady energy amount at a start of welding, the output decrease rotation angle Pd, and the overlap rotation Pw are the same for all the applying units.

7. A welding device for circumferentially melting and welding a cylindrical member pair in which another cylindrical member is inserted inside a cylindrical member, comprising:

an energy source that produces energy for melting and welding the pair of cylindrical members;

an applying unit that applies the energy generated by the energy source to the cylindrical member pair;

a rotating unit that relatively rotates the applying unit and the cylindrical member pair around an axis of the cylindrical member pair, and rotates an irradiation part of energy applied from the applying unit around the axis; and an adjusting unit that adjusts the amount of energy applied from the applying unit to the cylindrical member pair in association with a rotation angle of the cylindrical member pair around the axis, wherein the applying units are arranged at two or more locations in a circumferential direction on a plane orthogonal to the axis of the cylindrical member pair, in the adjusting unit, the adjustment of the amount of energy in a specific applying unit which is at least one of the applying units is executed in association with a rotation angle to satisfy a relationship of $Pd+Pw>\theta$, wherein $Pd$ is an output decease rotation angle that decreases the energy amount from a steady energy amount HP applied from the specific applying unit in a welding end process, $Pw$ is an overlap rotation angle at which the irradiation parts around the cylindrical member pair overlap with the steady energy amount HP, and $\theta$ is a separation angle between the specific applying unit and another applying unit adjacent to each other in a rotation direction around the axis.

* * * * *